US012158116B2

(12) United States Patent
Kim

(10) Patent No.: US 12,158,116 B2
(45) Date of Patent: Dec. 3, 2024

(54) COMPRESSION-IGNITION ENGINE OPERATING STRATEGY USING EARLY PILOT SHOTS OF METHANOL FUEL

(71) Applicant: Caterpillar Inc., Peoria, IL (US)

(72) Inventor: Charlie Chang-Won Kim, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/107,545

(22) Filed: Feb. 9, 2023

(65) Prior Publication Data

US 2024/0271580 A1 Aug. 15, 2024

(51) Int. Cl.
*F02D 41/00* (2006.01)
*F02D 41/40* (2006.01)

(52) U.S. Cl.
CPC ....... *F02D 41/0025* (2013.01); *F02D 41/403* (2013.01); *F02D 2200/021* (2013.01); *F02D 2200/0618* (2013.01)

(58) Field of Classification Search
CPC ............. F02D 2200/021; F02D 41/403; F02D 41/0025
See application file for complete search history.

(56) References Cited

U.S. PATENT DOCUMENTS 5,097,803 A * 3/1992 Galvin ................ F02D 19/0655 123/3
6,276,334 B1 8/2001 Cummins
7,793,637 B2 9/2010 Strom et al.
8,469,009 B2 6/2013 Munshi et al.
10,605,222 B2 3/2020 Idicheria et al.
10,669,958 B2 6/2020 Denso
11,125,180 B2 9/2021 Woodward
2005/0145220 A1 * 7/2005 Damitz ................. F02D 35/028 123/435

FOREIGN PATENT DOCUMENTS

DE 4140071 A1 * 6/1993 .......... F02B 23/0672
JP 2006250047 A * 9/2006

OTHER PUBLICATIONS

U.S. Appl. No. 16/891,170, filed Feb. 9, 2023, to Kim.

* cited by examiner

*Primary Examiner* — Kevin A Lathers
(74) *Attorney, Agent, or Firm* — Brannon Sowers & Cracraft PC

(57) ABSTRACT

Operating an engine includes injecting one or more early pilot shots of a liquid fuel containing methanol (MeOH) into a cylinder in an engine, and moving a piston in the cylinder from a bottom-dead center position toward a top-dead center position. Operating an engine further includes forming hydrogen peroxide (H2O2) in the cylinder from the MeOH of the early pilot shots, injecting a main shot of a liquid fuel into the cylinder, and hastening combustion of the liquid fuel of the main shot in the cylinder via hydroxyl (OH) radicals formed from dissociation of the H2O2. Injection of the one or more early pilot shots at appropriate crank angle timing(s) associated with suitable temperature ranges may promote desired reaction pathways according to a medium temperature combustion regime.

20 Claims, 3 Drawing Sheets

COMPRESSION-IGNITION ENGINE OPERATING STRATEGY USING EARLY PILOT SHOTS OF METHANOL FUEL

TECHNICAL FIELD

The present disclosure relates generally to a compression-ignition engine operating strategy, and more particularly to hastening combustion of a liquid fuel in an engine by way of hydroxyl radicals formed from dissociation of hydrogen peroxide.

BACKGROUND

Internal combustion engines are well-known and widely used throughout the world for a great many different purposes ranging from providing torque for machine propulsion to generating electricity for electrically powered machines and electrical power grids. In a typical implementation, a fuel is combusted with air in a cylinder in an engine to drive a piston in response to a rapid pressure and temperature increase in the cylinder. The piston causes a crankshaft to rotate, turning parts in a machine system. Spark-ignited engines are typically operated on gasoline or other liquid fuels, including some alcohol fuels, or gaseous fuels such as natural gas. Compression-ignition engines commonly use diesel, biodiesel, or various blends, and compress the fuel and air in the cylinder to an autoignition threshold rather than utilizing an electrical spark.

Increased engineering resources have been applied in recent years to engine technology that results in reduced levels of certain emissions, notably oxides of nitrogen or "NOx", and particulate matter, chiefly soot. Certain regulatory regimes and commercial interests are also directed at engine technologies for reducing levels of so-called greenhouse gas emissions. In an effort to continually improve emissions without sacrificing other performance criteria such as power, power density, and fuel efficiency, engineers have developed many different strategies for precisely and controllably delivering fuel into an engine cylinder for combustion.

One fuel injection strategy adopted in compression-ignition diesel engines employs a pilot shot of fuel that is injected in advance of a main shot of fuel and produces conditions in the cylinder that can assist in rapidly, efficiently, and cleanly combusting a main injection of the same liquid fuel. While compression-ignition multi-shot fuel injection strategies have proven to be highly successful in the case of diesel engines, application to other fuel types has proven more challenging. One known fuel injection strategy employing pilot shots in advance of a main shot is set forth in U.S. patent application Ser. No. 16/891,170 to Kim, now U.S. Pat. No. 11,143,137, issued Oct. 10, 2021.

SUMMARY OF THE INVENTION

In one aspect, a method of operating an engine includes injecting an early pilot shot of a liquid fuel containing methanol into a cylinder in the engine, and moving a piston from a bottom-dead center position toward a top-dead center position in the cylinder. The method further includes injecting a main shot of a liquid fuel into the cylinder, autoigniting the liquid fuel of the main shot in the cylinder, and hastening combustion of the liquid fuel of the main shot via reactive species produced from the methanol of the early pilot shot.

In another aspect, a method of operating an engine includes moving a piston coupled to a crankshaft in an engine from a bottom-dead center position toward a top-dead center position in a cylinder in the engine, and injecting an early pilot shot of a liquid fuel into the cylinder at a crank angle timing associated with a first cylinder temperature range sufficient for promoting production of hydrogen peroxide from the liquid fuel. The method further includes injecting a main shot of a liquid fuel into the cylinder, increasing a temperature in the cylinder to a higher cylinder temperature range sufficient for promoting production of hydroxyl radicals from the hydrogen peroxide, and autoigniting the liquid fuel of the main shot in the cylinder. At least one of the liquid fuel of the early pilot shot or the liquid fuel of the main shot contains methanol.

In still another aspect, a compression-ignition engine system includes an engine having a cylinder formed therein, and a piston movable in the cylinder between a bottom-dead center position and a top-dead center position to increase a temperature and a pressure in the cylinder. The engine system further includes an engine timing sensor, and a fuel system having a fuel supply of a liquid fuel containing methanol, and at least one electrically actuated fuel injector fluidly connected to the fuel supply and including a nozzle positioned in the cylinder. The engine system further includes a fueling control unit in communication with the engine timing sensor, and in control communication with the at least one electrically actuated fuel injector. The fueling control unit is structured to command injection of an early pilot shot of the liquid fuel from the at least one electrically actuated fuel injection at an earlier crank angle timing associated with a first cylinder temperature range having as a lower limit at least 700 K. The fueling control unit is further structured to command injection of a main shot of the liquid fuel from the at least one electrically actuated fuel injector at a later crank angle timing at or after the cylinder temperature reaching at least 900 K.

DETAILED DESCRIPTION

Figure 1:
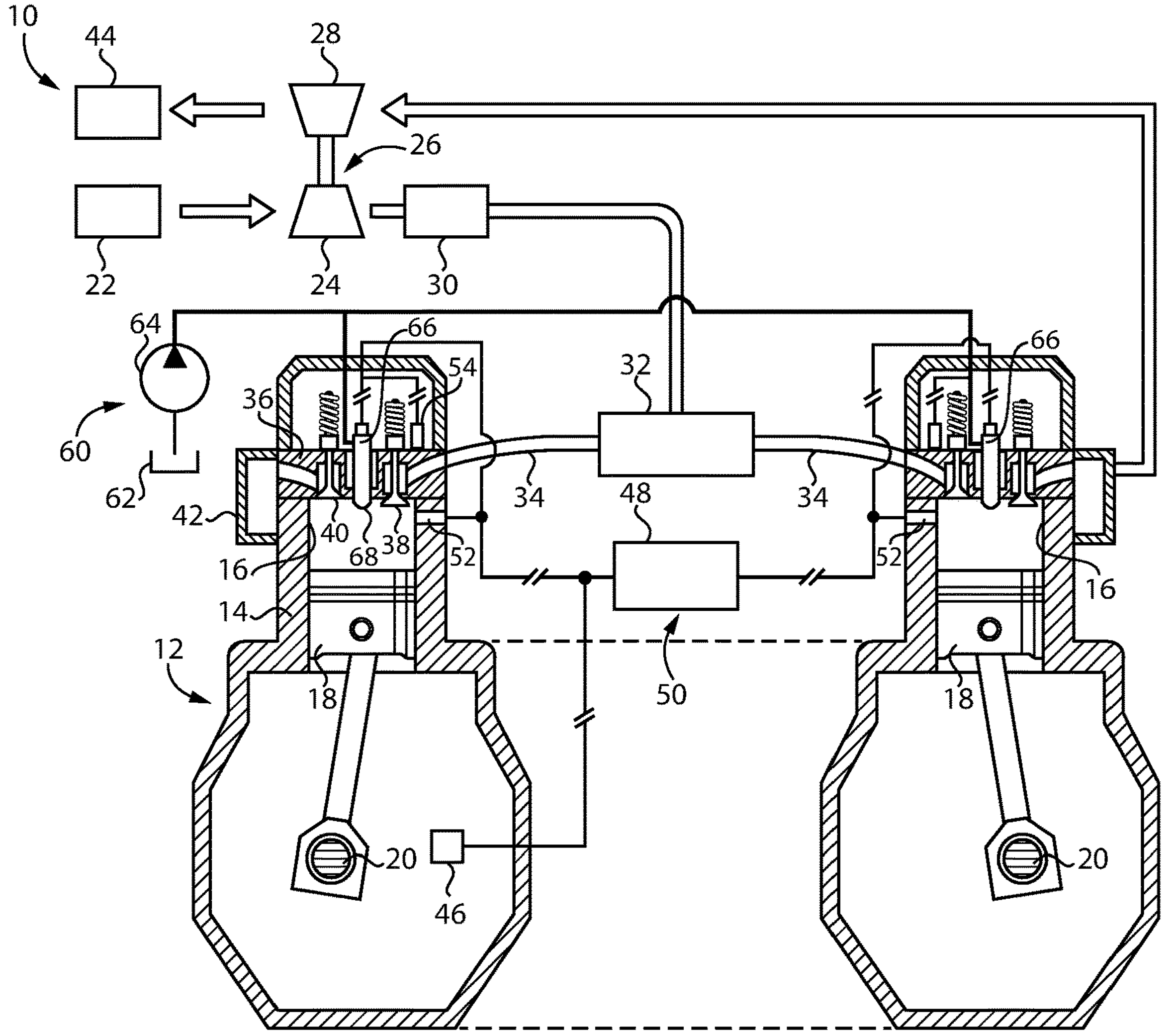
FIG. 1 is a diagrammatic view of an internal combustion engine system, according to one embodiment.

Referring to FIG. 1, there is shown an internal combustion engine system 10, according to one embodiment. Engine system 10 may be a compression-ignition engine system, including an engine 12 having an engine housing 14. Engine housing 14 includes one or more cylinders 16 formed therein. Engine 12 further includes one or more pistons 18 movable in cylinders 16. Engine 12 may include any number of cylinders in any suitable arrangement, such as in inline pattern, a V-pattern, or still another. It will be appreciated that a single cylinder engine configuration is within the scope of the present disclosure. Accordingly, description or discussion herein of a cylinder 16, a piston 18, or other components in the singular will be understood to refer by way of analogy to any other of such similar or identical components as may be used in engine system 10. Pistons 18 are coupled to a crankshaft 20 rotatable to power a load such as an electrical generator, a driveline in a vehicle, a pump, or a compressor to name a few examples. Pistons 18 are movable in cylinders 16 in a generally conventional manner between a bottom-dead center position and a top-dead center position to increase a temperature and a pressure in cylinders 16 to an autoignition threshold.

Engine system 10 further includes an air inlet 22 structured to feed intake air for combustion to a compressor 24 in a turbocharger 26. Compressed intake air is fed from compressor 24 through an aftercooler 30 to an intake manifold 32. From intake manifold 32 the compressed intake air is fed by way of intake runners 34 each extending to an engine head 36. Intake valves 38 and exhaust valves 40 are supported in engine head 36 and movable to control fluid communication between intake runners 34 and cylinders 16, and between cylinders 16 and an exhaust manifold 42. Exhaust is fed from exhaust manifold 42 to a turbine 28 of turbocharger 26 and to an exhaust outlet 44 such as an exhaust stack or tailpipe. In some embodiments aftertreatment equipment may receive a flow of exhaust from turbine 28. As an alternative or addition to turbocharger 26 a supercharger, or multiple turbocharger stages, might be used. In other embodiments no aftertreatment equipment at all may be used. As will be further apparent from the following description engine system 10 is uniquely configured for improved compression-ignition operation on certain fuels with low or near-zero levels of certain emissions including especially particulate matter or soot.

Engine system 10 may also include a control system 50. Control system 50 may include an engine timing sensor 46 coupled, for example, to crankshaft 20, to a geartrain, or to another rotatable component in engine system 10 having a known or determinable relationship to engine timing ("crank angle timing"). Engine timing sensor 46 may produce signals indicative of a crank angle timing of engine system 10, typically through an engine cycle corresponding to 360 degrees of crank angle rotation. In one implementation, engine system 10 may be operated in a conventional four-stroke engine cycle. The present disclosure is not hereby limited, however, and in other embodiments a Miller cycle, or still other engine cycles might be used.

Engine system 10 may also include variable valve actuators 54 coupled to intake valves 38. Variable valve actuators 54 may be structured to vary an opening timing, a closing timing, or even potentially both an opening timing and a closing timing, of intake valves 38 for control of temperature in cylinders 16 or for other purposes. Variable valve actuators 54 may be electrically actuated or hydraulically actuated, for example. Engine system 10 may also include cylinder pressure sensors 52. Cylinder pressure sensors 52 may produce pressure signals used for monitoring in-cylinder pressures in cylinders 16 including for purposes of monitoring combustion phasing, monitoring cylinder pressure rise rates, peak pressures, or other cylinder pressure parameters, potentially in combination with other monitored and/or manipulated variables as further discussed herein.

Control system 50 may also include an electronic control unit 48. Electronic control unit 48 can include any suitable computerized control unit having a central processing unit, such as a microprocessor or a microcontroller, and a suitable computer readable medium storing computer executable program instructions. Electronic control unit 48 may be in communication with engine timing sensor 46 and in communication with cylinder pressure sensors 52 to receive the respective sensor signals. Electronic control unit 48 may be in control communication with other components in engine system 10 including variable valve actuators 54 and components in a fuel system 60.

Fuel system 60 includes a fuel supply 62 of a liquid fuel containing methanol (MeOH). A liquid fuel containing MeOH as contemplated herein may be pure or substantially pure MeOH as well as MeOH blended with other fuels such as other alcohol fuels or potentially hydrocarbon distillate fuels. Fuel system 60 also includes a pump 64, or potentially multiple pumps, structured to convey and pressurize MeOH to an injection pressure for injection into cylinders 16 by way of at least one electrically actuated fuel injector 66 associated with each of cylinders 16. In some embodiments, fuel injectors 66 may pressurize fuel to an injection pressure within the respective injector using, for example, an internal cam-actuated or hydraulically actuated fuel pressurization plunger.

In the illustrated embodiment each cylinder 16 is associated with a total of one fuel injector 66. In other embodiments, multiple fuel injectors, such as a first fuel injector for a first type of liquid fuel and a second fuel injector for a second type of liquid fuel, might be used. Still other variations can inject two different fuels using two different fuel injection spray orifice sets in a single injector. At least one electrically actuated fuel injector 66 associated with each cylinder 16 is fluidly connected to fuel supply 62 and includes a nozzle 68 having fuel injection spray outlets (not shown) formed therein and positioned in the corresponding cylinder 16. Electronic control unit 48 may be or include a fueling control unit in communication with engine timing sensor 46 as noted above, and in control communication with the at least one electrically actuated fuel injector 66 associated with each cylinder 16.

Figure 2:
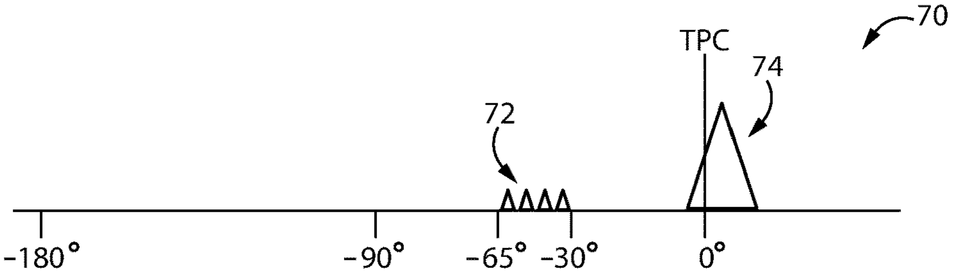
FIG. 2 is a chart of fuel injections in an engine cycle, according to one embodiment.

Referring also now to FIG. 2, there is shown a chart 70 illustrating example fuel injections in an engine cycle according to one embodiment. Electronic control unit 48 may be structured to command injection of one or more, typically a plurality, of early pilot shots 72 of the liquid fuel from fuel supply 62 by way of the at least one fuel injector 66 at a plurality of earlier crank angle timings. A total amount of the plurality of early pilot shots may include about 10% or less of a total amount of injected liquid fuel in an engine cycle, although the present disclosure is not thereby limited. The plurality of early pilot shots 72 are shown each having approximately the same quantity, however, again the present disclosure is not limited in this regard and two, three, four, or even possibly a greater number of early pilot shots could have differing quantities. The plurality of earlier crank angle timings may be associated with a first cylinder temperature range having as a lower limit at least 700 K (Kelvin), and typically about 750 K. The first cylinder temperature range may be from about 750 K to about 950 K in a refinement. As piston 18 moves from a bottom-dead-center position toward a top-dead-center position cylinder temperature increases. Hence, injection of one or more early pilot shots at the appropriate crank angle timing can result in the early pilot shots entering cylinder 16 in the first cylinder temperature range sufficient for promoting production of desirable reactive species from the MeOH of the early pilot shots, including hydrogen peroxide (H2O2) as further discussed herein.

Fueling control unit 48 may further be structured to command injection of a main shot 74 of a liquid fuel from the at least one fuel injector 68 at a later crank angle timing at or after cylinder temperature has reached a higher cylinder temperature range having as a lower limit about 900 K, and typically about 950 K. Increasing cylinder temperature to the higher cylinder temperature range may be sufficient for promoting production of desirable reactive species from the H2O2 including hydroxyl (OH) radicals formed from dissociation of the H2O2 as further discussed herein.

Forming H2O2 in cylinder 16 from the MeOH of the one or more early pilot shots is thus believed to result in production of OH radicals that can hasten combustion of the liquid fuel of the main shot. "Hastening combustion" means that burning of the liquid fuel of the main shot, including autoignition of the liquid fuel of the main shot, occurs relatively more rapidly at least initially than would be expected absent the OH radicals ultimately derived from the MeOH of the early pilot shots. In some instances, the injection of the main shot of liquid fuel may occur when cylinder temperature is in the higher cylinder temperature range. In other instances, the injection of the main shot could occur after the cylinder temperature reaching the higher cylinder temperature range and H2O2 has dissociated to OH and cylinder temperature has begun to decrease. In a practical implementation cylinder 16 may reach at least 900 K at or a few degrees before a top-dead-center crank angle timing. In some instances cylinder temperature could reach 900 K a few degrees after a top-dead-center crank angle timing. Injection of a main shot of a liquid fuel may cause cylinder temperature to briefly decrease, thus the precise moment at which cylinder temperature reaches at least 900 K and how long cylinder temperature stays at least 900 K may depend in part upon a timing of injection of a main shot.

MeOH may conventionally compression ignite at relatively higher compression ratios, such as about 24:1. According to the present disclosure, where the main shot of liquid fuel contains methanol, with the assistance of reactive species including OH radicals the methanol may be compression-ignited at compression ratios more commonly associated with traditional compression-ignition liquid fuels, such as from about 14:1 to about 15:1. Where the main shot of liquid fuel includes diesel, for example, the diesel may be compression-ignited at similar compression ratios, and potentially compression ratios that are lower still. In either case, combustion of the liquid fuel of the main shot may proceed faster than might otherwise be realized.

The in-cylinder processes described herein may be characterized according to the simplified reaction pathway:

$$R + O2 \rightarrow RO2 \rightarrow \text{Alkenes} + HO2 + HO2 \rightarrow O2 + H2O2 \rightarrow 2OH$$

In the above expression, R is a fuel radical, and HO2 is a hydroperoxyl radical. Alkenes are derived from reaction of methanol in the cylinder according to well-known processes. The above reaction pathway can further be understood as a medium temperature combustion pathway. While some OH radicals may be produced in early pilot shot strategies using traditional compression-ignition liquid fuels, the reaction processes in such cases tend to occur at lower in-cylinder temperatures, thus characterized in some instances as a "cool flame" combustion pathway, and the production of OH radicals may be less robust than the presently described medium temperature combustion. It has been discovered that MeOH lends itself to production of OH radicals according to such a medium temperature combustion pathway. When the cylinder temperature is increased to the first cylinder temperature range the production of H2O2 may be promoted. When the cylinder temperature is increased to the higher cylinder temperature range the dissociation of H2O2 to OH radicals may be promoted. Thus, by delivering the MeOH in the form of early pilot shots the MeOH can be used to produce the highly reactive OH radicals in abundance that hasten combustion of a main shot of liquid fuel whether that main shot includes MeOH, diesel, both, or still another liquid fuel. Certain implementations may also nevertheless utilize one or more early pilot shots of a compression-ignition liquid fuel such as diesel, followed by a main shot of a liquid fuel containing MeOH. As noted above diesel, and similar fuels, may favor a cool flame combustion pathway. At cylinder temperatures approximately 550 K to approximately 750 K, typically corresponding to about 75° to about 50° before a top-dead-center crank angle timing, OH radicals may be produced according to the simplified reaction pathway:

$$(R + O2 \rightarrow RO2 \rightarrow QOOH + O2 \rightarrow O2QOOH \rightarrow OH)$$

In the above reaction pathway R is a fuel radical and QOOH is hydroperoxyl radical. Early pilot shots in this strategy may be from diesel only or some of diesel and some of MeOH, for example, one of a plurality of early pilot shots being of MeOH and a second one of a plurality of early pilot shots being of diesel, enabling OH radicals to be produced by both diesel, or another compression-ignition fuel, and MeOH. In this scenario the "first" MeOH early pilot shot might be injected later than the "second" shot of compression-ignition liquid fuel. OH radicals can thus be produced according to the medium temperature combustion pathway discussed above and also the cool flame combustion regime. With some OH radicals produced at the relatively lower temperatures, below 900 K, it may be possible to operate an engine at relatively lower compression ratios or colder ambient temperatures. Embodiments are contemplated where one or more early pilot shots of diesel and one or more early pilot shots of MeOH are both used to assist in lighting off a main shot of a liquid fuel containing MeOH when the engine is cold at startup, then transitioning to early pilot shots of only MeOH followed by a main shot of MeOH once the engine has warmed. Embodiments might also utilize only compression-ignition fuel for one or more early pilots, and MeOH for a main shot.

Various manipulations of the in-cylinder environment may be performed to vary in-cylinder temperatures, including but not limited to exhaust gas recirculation (EGR), bypassing an aftercooler with compressed intake air from the compressor, varying intake valve opening or closing timings, or still others. Compression ratios in engine system 10 may be similar to compression ratios in traditional diesel engines. It is thus contemplated that certain engines operated under certain conditions may have a given crank angle timing range suitable for injection of the early pilots to achieve the target outcomes of the present disclosure. When such engines are operated under different conditions a different crank angle timing range suitable for injection of the early pilot shots may exist.

In an embodiment, one or more early pilot shots may be injected at one or more crank angle timings from about 65° to about 30° before a top-dead-center crank angle timing. In a refinement, the early pilot shots may be injected from about 60° to about 35° before the top-dead-center crank angle timing. FIG. 2 illustrates four early pilot shots 72 injected successively between about 65° and about 30° before 0° corresponding to the top-dead center crank angle timing. From the foregoing description it will be appreciated that early pilot shots 72 include liquid fuel containing MeOH and main shot 74 includes liquid fuel containing MeOH. In other embodiments, as suggested above alternative fuels might be used for a main shot substituting for MeOH or in addition to MeOH.

Figure 3:
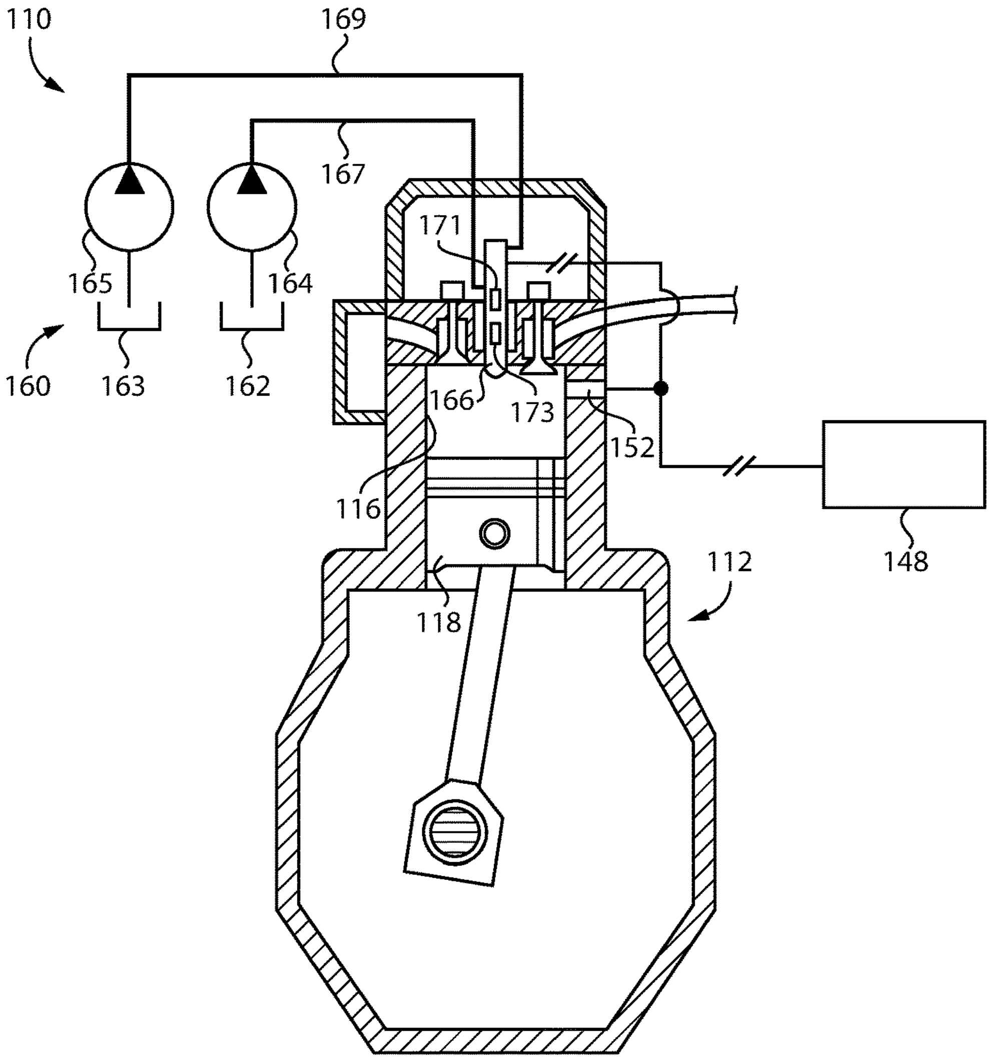
FIG. 3 diagrammatic view of an internal combustion engine system, according to another embodiment.

To this end, and turning now to FIG. 3, there is shown a compression-ignition engine system 110 having certain similarities to the embodiments discussed above but also certain differences. Description and discussion relative to any one embodiment herein may be understood to apply to any other embodiments except where otherwise indicated or apparent from the context. Engine system 110 includes an engine 112 having a cylinder 116 formed therein, and a piston 118 movable in cylinder 116. Engine system 110 also includes a fuel system 160. Fuel system 160 includes a fuel supply 162 containing a liquid fuel containing MeOH. A fuel supply conduit 167 extends from a pump 164 to a fuel injector 166 extending into cylinder 118.

Engine system 110 also includes a second fuel supply 163. Second fuel supply 163 may contain a second liquid fuel such as a diesel distillate fuel or another suitable compression-ignition fuel. A compression-ignition fuel as contemplated herein includes a fuel that will tend to autoignite in an engine having a compression ratio from about 12:1 to about 18:1. Other suitable compression-ignition fuels include diesel, JP8, or even a lower cetane fuel with a cetane enhancer. The fuel contained in fuel supply 163 may have a cetane number of at least 38 in some embodiments. A second fuel supply conduit 169 extends from a second pump 165 to fuel injector 166.

In the illustrated embodiment fuel injector 166 is the sole injector associated with cylinder 116 and includes a first electrical actuator 171, such as a solenoid actuator that controls injection of the liquid fuel containing methanol supplied by way of fuel supply conduit 167. Fuel injector 166 also includes another electrical actuator 173, such as another solenoid actuator, that is operated to inject the fuel supplied by way of fuel supply conduit 169. Thus, the embodiment of FIG. 3 includes one fuel injector configured, such as by way of two nozzle checks and two electrical actuators, to inject two different fuels. As suggested above, in other embodiments more than one fuel injector per cylinder might be used.

Engine system 110 also includes a fueling control unit 148 that is structured to command injection of one or more early pilot shots of a liquid fuel containing MeOH via control current commands to electrical actuator 171, and to command injection of a main shot of a liquid fuel by way of control current commands to electrical actuator 173. Electrical actuators 171 and 173 might include control valve electrical actuators operated to actuate a control valve that varies a closing hydraulic pressure applied to a closing hydraulic surface of a nozzle or needle check in some examples. The present disclosure is not limited with regard to the type or manner of operation of fuel injectors contemplated herein. Moreover, as discussed above some embodiments can include, at least at times, one or more early pilot shots of a compression-ignition liquid fuel such as diesel or a plurality of early pilot shots including some of compression-ignition fuel and some of MeOH.

Figure 4:
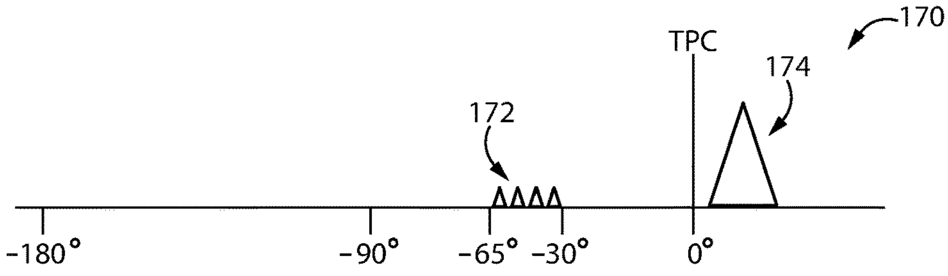
FIG. 4 is a chart of fuel injections in an engine cycle, according to one embodiment.

Referring also to FIG. 4, there is shown a chart 100 illustrating fuel injections in an example engine cycle. Generally analogous to the example fuel injections depicted in chart 70, in the example of FIG. 4 a plurality of early pilot shots 172 of the liquid fuel containing MeOH are performed between about 65° and about 30° before atop-dead center crank angle timing. A main shot of liquid fuel 174 containing, for example, diesel, is injected at a later crank angle timing. It can be noted main shot 174 occurs after the top-dead center crank angle timing. It has been discovered the desirable reactive species that can be produced from MeOH injected in the early pilot shots can hasten combustion of not only a MeOH main shot but other fuel types in a main shot. In the case of diesel, a crank angle timing of main shot 174 may be retarded past the top-dead-center or 0° crank angle timing. As a result, the combustion of the main shot containing diesel may occur robustly but at somewhat cooler in-cylinder temperatures than would exist for an injection at top-dead center crank angle timing. In at least some instances the relatively cooler combustion of the main injection may be associated with reductions in certain emissions including NOx.

Engine system 110 may thus be operated to inject one or more early pilot shots of MeOH, and a main shot of diesel or MeOH. In other instances engine system 110 may be operated to inject one or more early pilot shots of MeOH, and a main shot(s) of both diesel and MeOH. It will be recalled that fuel injector 166 may include two sets of spray orifices, one for each fuel type. In some instances, fuel injector 166 might be operated via suitable control current commands from fueling control unit 148 to inject both MeOH and diesel at the same timing, or at different timings, with the ratio of MeOH to diesel being variable and controllable.

Engine system 110 may also include a cylinder pressure sensor 152. Cylinder pressure sensor 152 is structured to monitor cylinder pressure of cylinder 116. Fueling control unit 148 may be structured to vary a size of the one or more early pilot shots, and to vary a timing and/or potentially a substitution ratio of MeOH to diesel in the main shot, based on the monitored cylinder pressure. Monitoring cylinder pressure can enable monitoring of factors such as cylinder pressure rise rate, monitoring combustion phasing, and monitoring cylinder peak pressure. In a practical application, fueling control unit 148 may be structured to optimize the effects of OH radicals on hastening combustion to various ends including emissions and efficiency. In general terms, a greater quantity of MeOH injected in one or more early pilot shots will produce more OH radicals, resulting in faster combustion. At the same time faster combustion can result in a greater peak pressure in cylinder 116.

In one example, fueling control unit 148 might monitor peak cylinder pressure and/or another cylinder pressure parameter such as peak pressure rise rates, and increase a size (quantity) of the one or more early pilot shots to cause combustion to proceed as fast as is practicable without exceeding a target peak cylinder pressure. Such an approach may allow the injection timing of the main shot to be progressively retarded as the quantity of OH radicals is increased. If peak cylinder pressure, or for example peak pressure rise rate, becomes too high the size of the one or more early pilot shots can be reduced. Those skilled in the art will be familiar with the tradeoff that can exist between efficiency, typically expressed as brake specific fuel consumption (BSFC), and NOx production. According to the present disclosure, the tradeoff between BSFC and NOx may be optimized by varying a size of the one or more early pilot shots to achieve aggressive combustion and relatively reduced NOx production whilst limiting penalties to BSFC.

Figure 5:
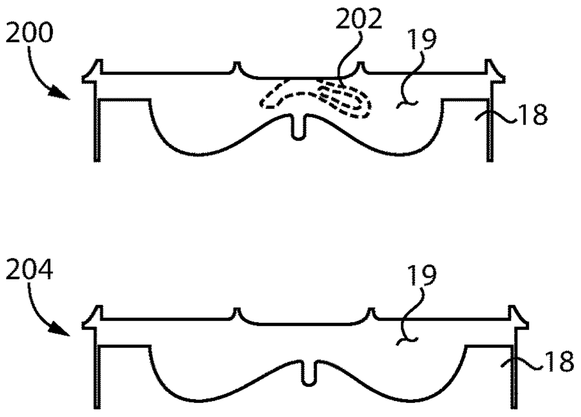
FIG. 5 is a diagrammatic view showing approximate distributions of reactive species in a cylinder at an earlier crank angle timing.
Figure 6:
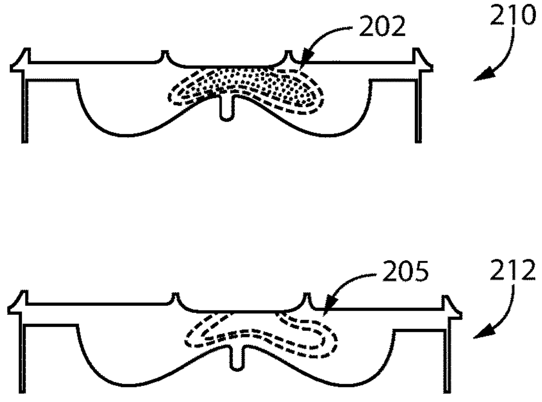
FIG. 6 is a diagrammatic view showing approximate distributions of reactive species in a cylinder at a later crank angle timing.

Referring now to FIGS. 5 and 6, there are shown images representing the expected presence of certain reactive species during an engine cycle at different crank angle timings. FIG. 5 includes a first image 200 where early pilot shots of MeOH have been injected and piston 18 is moving toward the top-dead-center position. It can be seen that H2O2 at numeral 202 has formed in a combustion bowl 19 of piston 18. A second image 204 shows a substantially zero presence of OH radicals in combustion bowl 19 at the same crank angle timing. The reactive species present in FIG. 5 might be observed where temperature in the cylinder is in the first cylinder temperature range of about 700 K to about 900 K as described herein.

FIG. 6 shows in an image 210 of H2O2 again at numeral 202 that is actively dissociating. In image 212 of FIG. 6 it can be seen there is a robust presence of OH radicals at numeral 205 somewhat concentrated toward the piston surface. The reactive species present in FIG. 6 might be observed where temperature in the cylinder is in the higher cylinder temperature range as described herein, at least 900 K and typically at least 950 K. Injection of the main shot can occur directly into the OH radicals 205 contemporaneous with formation of the OH radicals or shortly thereafter and while still present in the cylinder.

INDUSTRIAL APPLICABILITY

Figure 7:
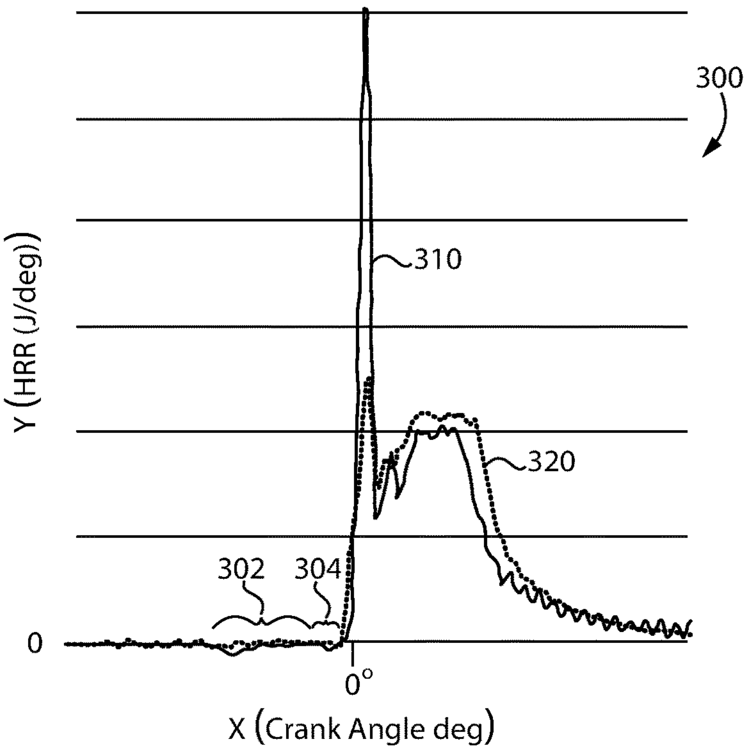
FIG. 7 is a graph showing heat release in an engine cycle, according to one embodiment.

Referring to the drawings generally, but focusing now on FIG. 7, there is shown a graph 300 of heat release during an engine cycle on the Y-axis in comparison to crank angle on the X-axis. A trace 310 shows heat release that might be observed for a relatively larger quantity of MeOH injected in a plurality of early pilot shots, and a main shot of MeOH at approximately a top-dead-center crank angle timing. A trace 320 shows heat release that might be observed for a relatively lesser quantity of MeOH in a plurality of early pilot shots and a main shot of MeOH at approximately the top-dead-center crank angle timing.

A region 302 of both of traces 310 and 320 represents in-cylinder conditions in the first cylinder temperature range discussed herein where H2O2 is being produced from the MeOH with HO2 as an intermediate. A region 304 of both of traces 304 represents in-cylinder conditions in the higher cylinder temperature range discussed herein where H2O2 is dissociating to OH radicals. Numeral 330 identifies a negative portion of both heat release curves where it can be seen that the larger early pilot shot quantity 310 has a relatively larger drop in temperature (negative heat release) and the smaller early pilot shot quantity 320 has a relatively smaller drop in temperature.

FIG. 7 also shows a much larger heat release spike in trace 310 as compared to trace 320 showing the relative sensitivity of combustion speed to the presence and/or quantity of OH radicals. Both trace 310 and trace 320 show a second peak caused by further combustion of the MeOH of the main shot that occurs as in-cylinder mixing of fuel and air continues following the main peak at about the top-dead-center crank angle timing.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. The terms "about" and like relative terms used herein mean generally or approximately, as would be understood by a person of ordinary skill in the internal combustion arts, including within measurement error or another standard of approximation or estimation applicable under the circumstances such as conventional numerical rounding. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an engine comprising:

injecting an early pilot shot of a liquid fuel containing methanol into a cylinder in the engine, including injecting the early pilot shot as a liquid through a fuel injector;

moving a piston from a bottom-dead-center position toward a top-dead-center position in the cylinder;

injecting a main shot of a liquid fuel into the cylinder;

autoigniting the liquid fuel of the main shot in the cylinder; and hastening combustion of the liquid fuel of the main shot via reactive species produced from the methanol of the early pilot shot in the cylinder in a temperature range from about 700 K to about 900 K.

2. The method of claim 1 wherein the liquid fuel of the main shot includes methanol, and the engine defines a cylinder compression ratio of about 15:1 or less.

3. The method of claim 1 further comprising forming hydrogen peroxide in the cylinder from the methanol of the early pilot shot, and the hastening the combustion includes hastening the combustion via hydroxyl radicals formed from the hydrogen peroxide.

4. The method of claim 3 wherein the temperature range includes a first temperature range, and further comprising increasing a temperature in the cylinder, based on the moving the piston, to the first temperature range so as to form the hydrogen peroxide from the methanol, and then to a higher temperature range so as to form the hydroxyl radicals from the hydrogen peroxide.

5. The method of claim 4 wherein the first temperature range has as a lower limit at least 700 K, and the second temperature range has as a lower limit at least 900 K.

6. The method of claim 4 further comprising promoting, based on the increasing a temperature in the cylinder to a higher temperature range, dissociation of the hydrogen peroxide to form the hydroxyl radicals.

7. The method of claim 1 wherein:

the early pilot shot is one of a plurality of early pilot shots, and at least one of the plurality of early pilot shots includes the liquid fuel containing MeOH; and a timing of the injection of the at least one of the plurality of early pilot shots is from about 65° to about 30° before a top-dead-center crank angle timing of the engine.

8. The method of claim 7 wherein a second one of the plurality of early pilot shots contains a compression-ignition liquid fuel, and a timing of the injection of the second one of the plurality of early pilot shots is from about 75° to about 50° before the top-dead center crank angle timing of the engine.

9. The method of claim 1 wherein the main shot of a liquid fuel contains a compression-ignition fuel.

10. The method of claim 9 wherein a timing of the injection of the main shot of a liquid fuel is retarded past a top-dead-center crank angle timing of the engine.

11. The method of claim 1 wherein the main shot of a liquid fuel contains methanol.

12. A method of operating an engine comprising:

moving a piston coupled to a crankshaft in an engine from a bottom-dead-center position toward a top-dead-center position in a cylinder in the engine;

injecting an early pilot shot of a liquid fuel into the cylinder at a crank angle timing associated with a first temperature range in the cylinder from about 700 K to about 900 K and sufficient for promoting production of hydrogen peroxide from the liquid fuel, and including injecting the early pilot shot as a liquid through a fuel injector;

injecting a main shot of a liquid fuel into the cylinder;

increasing a temperature in the cylinder to a higher temperature range sufficient for promoting production of hydroxyl radicals from the hydrogen peroxide; and autoigniting the liquid fuel of the main shot in the cylinder;

wherein at least one of the early pilot shot of a liquid fuel or the main shot of a liquid fuel contains methanol.

13. The method of claim 12 wherein the first temperature range has as a lower limit at least 700 K, and the higher temperature range has as a lower limit at least 900 K.

14. The method of claim 13 wherein the crank angle timing is from about 65° to about 30° before a top-dead-center crank angle timing.

15. The method of claim 12 wherein the liquid fuel of the main shot and the liquid fuel of the early pilot shot both contain methanol.

16. The method of claim 12 wherein the liquid fuel of the main shot contains a compression-ignition fuel.

17. The method of claim 12 further comprising promoting production of the hydroxyl radicals from dissociation of the hydrogen peroxide.

18. A compression-ignition engine system comprising:

an engine having a cylinder formed therein, and a piston movable in the cylinder between a bottom-dead-center position and a top-dead-center position to increase a temperature and a pressure in the cylinder;

an engine timing sensor;

a fuel system including a first fuel supply of a liquid fuel containing methanol, and at least one electrically actuated fuel injector fluidly connected to the first fuel supply and including a nozzle positioned in the cylinder;

a fueling control unit in communication with the engine timing sensor, and in control communication with the at least one electrically actuated fuel injector, the fueling control unit being structured to:

command injection of an early pilot shot of the liquid fuel from the at least one fuel injector at an earlier crank angle timing associated with a first cylinder temperature range having as a lower limit at least 700 K; and command injection of a main shot of a liquid fuel from the at least one fuel injector at a later crank angle timing at or after the cylinder temperature reaching at least 900 K;

the fuel system further including a second fuel supply containing a compression-ignition liquid fuel, and the electronic control unit is further structured to command injection of the main shot of the liquid fuel including the compression-ignition liquid fuel.

19. The engine system of claim 18 wherein the later crank angle timing is retarded past a top-dead-center crank angle timing.

20. The engine system of claim 19 further comprising a cylinder pressure sensor structured to monitor a cylinder pressure parameter, and wherein the fueling control unit is further structured to vary a size of the early pilot shot and a timing of the injection of the main shot, based on the monitored cylinder pressure parameter.

* * * * *